United States Patent
Carlsson et al.

(10) Patent No.: US 12,439,019 B1
(45) Date of Patent: Oct. 7, 2025

(54) REDUCING VISUAL JOLTS DURING TRACKING LOSS AND GAIN IN AUTOSTEREOSCOPIC DISPLAYS

(71) Applicant: Distance Technologies Oy, Helsinki (FI)

(72) Inventors: Thomas Carlsson, Vantaa (FI); Harri Kapanen, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/220,926

(22) Filed: May 28, 2025

(51) Int. Cl.
  *H04N 13/302* (2018.01)
  *G02B 27/00* (2006.01)
  *G02B 27/01* (2006.01)
  *G06F 1/3212* (2019.01)
  *G06F 1/3234* (2019.01)
  *H04N 13/128* (2018.01)
  *H04N 13/368* (2018.01)
  *H04N 13/383* (2018.01)

(52) U.S. Cl.
  CPC ....... *H04N 13/302* (2018.05); *G02B 27/0093* (2013.01); *G02B 27/0101* (2013.01); *G06F 1/3212* (2013.01); *G06F 1/3265* (2013.01); *H04N 13/128* (2018.05); *H04N 13/368* (2018.05); *H04N 13/383* (2018.05); *G02B 2027/014* (2013.01)

(58) Field of Classification Search
  CPC .. H04N 13/302; H04N 13/128; H04N 13/368; H04N 13/383; G02B 27/0093; G02B 27/0101; G02B 2027/014; G06F 1/3212; G06F 1/3265

USPC ........................................................... 348/13
See application file for complete search history.

(56) References Cited

U.S. PATENT DOCUMENTS

| | | | | |
|---|---|---|---|---|
| 2006/0139447 A1* | 6/2006 | Unkrich | ................. | H04N 13/31 348/42 |
| 2007/0188667 A1* | 8/2007 | Schwerdtner | ........ | H04N 13/305 348/E13.05 |
| 2008/0231805 A1* | 9/2008 | Schwerdtner | ............. | G06T 7/73 348/E13.047 |
| 2014/0300536 A1* | 10/2014 | Kim | ..................... | H04N 13/383 345/156 |
| 2015/0062311 A1* | 3/2015 | Malzbender | ........... | H04N 13/32 348/51 |
| 2020/0125167 A1* | 4/2020 | Dahl | ....................... | G06F 18/22 |
| 2020/0226818 A1* | 7/2020 | McCarthy | ............. | G06T 15/205 |

(Continued)

*Primary Examiner* — Tung T Vo
(74) *Attorney, Agent, or Firm* — Ziegler IP Law Group LLC.

(57) ABSTRACT

A system includes a tracker, an autostereoscopic display, and at least one processor. The at least one processor is configured to track an eye position of a given eye of a given user relative to an image plane of the autostereoscopic display, using the tracker. The at least one processor is further configured to detect when the eye position of given eye is no longer trackable by the tracker. When the eye position is no longer trackable, the at least one processor is configured to generate or retrieve an image for display to the given eye, increment a tracking counter, map a value of the tracking counter to a transition level, and perform at least one of modifying pixel intensity values of the image based on the transition level to fade out the image, or interpolating a virtual depth in the image based on transition level, and display the image.

17 Claims, 2 Drawing Sheets

(56) References Cited

U.S. PATENT DOCUMENTS

2020/0304769 A1* 9/2020 Bickerstaff ............ G02B 30/34
2021/0132693 A1* 5/2021 Pulli .................. G02B 27/0093
2021/0364988 A1* 11/2021 Hornstein ............ H04N 13/376
2024/0404488 A1* 12/2024 Shehata ................. G09G 5/391
2025/0000372 A1* 1/2025 Wu .................... B64D 45/0056

* cited by examiner

REDUCING VISUAL JOLTS DURING TRACKING LOSS AND GAIN IN AUTOSTEREOSCOPIC DISPLAYS

TECHNICAL FIELD

The present disclosure relates to systems comprising autostereoscopic displays configured to display images based on tracking eye position of given user. The present disclosure also relates to methods for displaying images via autostereoscopic displays configured to display images based on tracking eye position of given user.

BACKGROUND

Autostereoscopic displays provide three-dimensional (3D) visualization of images without requiring specialized eyewear. As a result, the autostereoscopic displays are increasingly used in automotive head-up displays (HUDs), augmented reality (AR) systems, and other display applications requiring 3D visualization of images. The autostereoscopic displays generally rely on tracking systems configured to estimate a position of at least one eye of a viewer relative to an image plane of the autostereoscopic display. Further, based on the estimated eye position, image content is rendered in a viewer-specific manner to support stereoscopic depth perception by the viewer.

In practical implementations, face and eye tracking of the viewer may be hindered by occlusions or edge cases. For example, the face and eye tracking of the viewer may fail when the viewer is looking away from the autostereoscopic display, when the face of the viewer is temporarily obscured by a hand or other object, or when the viewer is entering or leaving a field of view of a face tracking sensor. Moreover, degradation of the face and eye tracking may also occur at extreme angles of the face of the viewer relative to the tracking sensor or when estimated locations of the eyes of the viewer receive low confidence values from a face fitting algorithm. In such cases, either a face fit with a low confidence value is produced or the face tracking is not possible at all.

In a single viewer system, similar face and eye tracking limitations may arise when one viewer is leaving a viewing area of the autostereoscopic display while another viewer is entering the viewing area. During such movement of viewers, it becomes difficult to determine what image content should be rendered on the autostereoscopic display. Further, rendering the image content to a last known eye position of the previous viewer may result in misalignment of the rendered image content with a current eye position of the new viewer. Moreover, rendering no content may result in blinking that appears visually jarring to the viewer near the autostereoscopic display. It will be appreciated that both conditions cause degradation in viewing quality at the beginning or end of a viewing session or during periods of temporary tracking loss.

Therefore, there exists a need to address rendering behaviour of autostereoscopic displays under conditions of temporary face tracking loss or viewer transitions, without introducing blinking, misalignment, or abrupt changes in visuals.

SUMMARY

The present disclosure seeks to provide a system comprising an autostereoscopic display configured to display images based on tracking eye position of given user, and a method for displaying images via the autostereoscopic display configured to display images based on tracking eye position of given user. The aim of the present disclosure is achieved by the system and the method as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system comprising:
 a tracker;
 an autostereoscopic display; and
 at least one processor configured to:
  track an eye position of a given eye of a given user relative to an image plane of the autostereoscopic display, using the tracker;
  detect when the eye position of the given eye is no longer trackable by the tracker; and
  when it is detected that the eye position of the given eye is no longer trackable by the tracker:
   generate or retrieve an image for display to the given eye;
   increment a tracking counter;
   map a value of the tracking counter to a transition level;
   perform at least one of:
    (i) modifying pixel intensity values of the image, based on the transition level, to fade out the image,
    (ii) interpolating a virtual depth at which at least one virtual object is presented in the image, between an original virtual depth of the at least one virtual object and a pre-selected virtual depth, based on the transition level; and
   display the image;
  wherein the incrementing of the tracking counter, the mapping of the value of the tracking counter to the transition level, the performing of the at least one of:

(i), (ii), and the displaying of the image are repeated until the tracking counter reaches a first predefined threshold value.

In a second aspect, the present disclosure provides a method comprising:
- tracking an eye position of a given eye of a given user relative to an image plane of an autostereoscopic display, using a tracker;
- detecting when the eye position of the given eye is no longer trackable by the tracker; and
- when it is detected that the eye position of the given eye is no longer trackable by the tracker:
  - generating or retrieving an image for display to the given eye;
  - incrementing a tracking counter;
  - mapping a value of the tracking counter to a transition level;
  - performing at least one of:
    - (i) modifying pixel intensity values of the image, based on the transition level, to fade out the image,
    - (ii) interpolating a virtual depth at which at least one virtual object is presented in the image, between an original virtual depth of the at least one virtual object and a pre-selected virtual depth, based on the transition level; and
  - displaying the image via the autostereoscopic display;
- wherein the incrementing of the tracking counter, the mapping of the value of the tracking counter to the transition level, the performing of the at least one of: (i), (ii), and the displaying of the image are repeated until the tracking counter reaches a first predefined threshold value.

The present disclosure provides the system and the method for displaying images using the autostereoscopic display. The system comprises the tracker, the autostereoscopic display, and the at least one processor. In certain implementations, the system is implemented in heads-up display (HUDs) configured for use in automotive settings, where the autostereoscopic display presents images that appear at a virtual depth and the tracker tracks the eye position of the given eye of the given user relative to the image plane of the autostereoscopic display.

The system is configured to respond to when the eye position of the given eye of the given user is detectable as opposed to when the eye position of the given eye of the given user is not detectable by the tracker. In operation, the tracker provides input to the at least one processor representing whether the eye position of the given eye can be detected. Further, an ability of the eye tracker to detect the eye position may be affected in practical implementations by factors such as temporary occlusions, extreme viewing angles, or momentary loss of visibility of the eye due to movement or motion of the user. For example, when the user turns their head sharply or temporarily looks away from the autostereoscopic display, the tracker may not receive sufficient input to determine the eye position. When the system detects that the eye position is no longer trackable, it begins a controlled transition process by incrementing the tracking counter each time the eye position cannot be determined. The value of the tracking counter is used to derive a transition level that is applied to modify the image displayed to the given eye of the given user.

The at least one processor is configured to use the transition level to adjust the display of the image when the eye position is not being detected. In particular, the system performs at least one of modifying pixel intensity values of the image to reduce visual prominence of the image or interpolating the virtual depth at which at least one virtual object is presented in the image between an original virtual depth and a modified virtual depth. For example, if the original virtual depth corresponds to a location in space where a three-dimensional object is intended to appear in front of the display, such as at a distance of one metre from the user, the system interpolates the virtual depth towards a pre-selected virtual depth associated with the physical location of the autostereoscopic display, such as a display surface of the autostereoscopic display. The interpolation by the system gradually reduces the perception of depth, making the virtual object appear to recede toward the display surface. Similarly, if pixel intensity values are being modified, the system progressively reduces the brightness or contrast of the image, resulting in fade-out of the image. For example, a virtual icon initially rendered with full pixel intensity may transition to a more transparent or desaturated version of the virtual icon over time. The repetition of the modification of the virtual depth or the pixel intensity values over a sequence of images allows the system to perform a visual transition that avoids sudden disappearance of the image when the eye position is no longer trackable.

The repetition of adjustment of the image continues until the tracking counter reaches the predefined value, which corresponds to a limit beyond which the system considers the eye position to have remained undetected for a sustained period. Further, until the tracking counter reaches the predefined value, the image is displayed to the given eye with gradual changes applied according to the transition level. A technical benefit of applying the changes to the transition level is maintaining of a consistent visual experience during temporary periods in which the eye position is not detected and reducing the likelihood of sudden changes in the image that may cause visual discomfort to the user.

In practical applications, such as automotive HUDs, the system ensures that users do not experience abrupt visual interruptions due to short-term tracking issues, such as when briefly looking away from the autostereoscopic display or when the tracking of the eye position of the user is momentarily obstructed by environmental factors. The system accommodates the abrupt visual interruptions by adjusting the displayed image in a controlled manner, based on the number of instances where the eye position is not detected. The image is adjusted across repeated image frames or selected image frames, depending on a configuration of the system. A technical benefit of using selected frames for computing the transition level and applying image adjustments is reduction of workload and conserving energy of the processor, particularly in battery-powered implementations of the system.

Moreover, when the tracker detects the eye position of the given eye of the given user again, the system reverses the previous adjustment by decrementing the tracking counter from the predefined value. A new image is generated or retrieved based on the newly detected eye position. The new image is progressively displayed to the given eye of the given user. The system determines the transition level based on the current value of the tracking counter and applies the transition level to at least one of modifying pixel intensity values to fade in the image or interpolating the virtual depth from a pre-selected virtual depth back to the original virtual depth. For example, when interpolating the virtual depth, if the pre-selected virtual depth corresponds to the surface of the autostereoscopic display and the original virtual depth corresponds to a location in front of the autostereoscopic display, such as one metre from the user, the interpolation gradually brings the perceived position of the virtual object forward from the display surface to the intended three-dimensional location in front of the autostereoscopic display. Similarly, if the system is modifying pixel intensity values, the system increases the brightness or contrast of the virtual object in the new image. For example, a virtual indicator that was previously faded or rendered semi-transparent during tracking loss of the eye position of the user is incrementally restored to full brightness and opacity. The repetition of the adjustment continues until the tracking counter reaches a second predefined value, which corresponds to a return to full display of the image. A technical benefit of the reversal of the previously applied transition using the transition level derived from the decrementing tracking counter is that the adjustment is performed gradually based on the detected eye position, avoiding sudden visual changes and supporting consistent viewing when tracking resumes.

The use of the tracking counter to increment or decrement based on whether the eye position is detected or not enables the system to function reliably across changes in viewing behaviour or temporary tracking loss. The mapping of the tracking counter to the transition level and the use of the transition level to determine one or both of pixel intensity modification and virtual depth interpolation allows the image to be displayed in a controlled manner, even under changing tracking input. The application of the tracking counter and the transition level to adjust the display of the image reduces sudden visual shifts and maintains continuity of the image displayed to the given eye of the given user when the viewing condition changes.

The method allows continuous display of the image to the given eye of the given user under conditions in which the eye position cannot be detected, by progressively adjusting the pixel intensity values or the virtual depth of the at least one virtual object in the image. A technical benefit of adjusting the pixel intensity values or the virtual depth based on the transition level is the reduction of abrupt disappearance of image content during short-term interruptions in detection of the eye position of the given eye, including conditions such as head movement of the user or temporary occlusion. A further technical benefit of mapping the tracking counter to the transition level is the gradual reappearance of the image when the eye position of the given eye is detected again, enabling consistent and visually stable operation during resumption of tracking. Additionally, the method supports application of the adjustment steps over selected image frames, thereby allowing reduction of computational operations and improvement of power efficiency in implementations such as automotive HUDs.

The autostereoscopic display is configured to display images based on tracking the eye position of the given eye of the given user. The autostereoscopic display is implemented in display systems configured to present different image content to different viewing positions of different users. For example, the system is implemented in HUDs incorporating the autostereoscopic display. The autostereoscopic display supports image presentation specific to different users based on the tracked eye position of the given eye of the given user. The autostereoscopic display enables presentation of the image to the given eye of the given user at the virtual depth determined relative to the image plane of the autostereoscopic display. The ability to direct the image content to the given eye of the given user based on the tracked position of the given eye allows the system to distinguish between trackable and non-trackable states of the given eye, enabling control over how the image is displayed under varying tracking conditions.

The tracker is configured to track the eye position of the given eye of the given user relative to the image plane of the autostereoscopic display. The term "image plane" as used throughout the present disclosure refers to a surface at which the image is perceived to be located, including a physical light-emitting surface of the autostereoscopic display or a virtual surface appearing through an optical combiner or one or more mirrors. The tracker allows convenient tracking of the eye position of the given eye of the given user and detecting when the eye position of the given eye is no longer trackable. The detection of whether the eye position of the given eye of the given user is trackable or not enables transition into operations configured to control image display to the given eye, based on the tracking state. A technical benefit of the tracker is the ability to distinguish between trackable and no longer trackable states, contributing to maintaining consistent presentation of the image during temporary periods when the eye position of the given eye of the given user is not trackable.

The system further comprises at least one processor configured to track the eye position of the given eye of the given user relative to the image plane of the autostereoscopic display, using the tracker and detect when the eye position of the given eye is no longer trackable by the tracker. The at least one processor is configured to determine the eye position of the given eye relative to the image plane based on data received from the tracker. The ability of the at least one processor to determine whether the eye position of the given eye is trackable enables the at least one processor to modify or interpolate the image when tracking of the given eye is lost.

Moreover, when it is detected that the eye position of the given eye of the given user is no longer trackable by the tracker, the at least one processor is configured to generate or retrieve the image for display to the given eye, increment the tracking counter, map the value of the tracking counter to the transition level and perform at least one of modifying pixel intensity values of the image, based on the transition level, to fade out the image and interpolating the virtual depth at which at least one virtual object is presented in the image, between the original virtual depth of the at least one virtual object and the pre-selected virtual depth, based on the transition level. The term "tracking counter" as used throughout the present disclosure refers to a numerical value incremented when the eye position of the given eye of the given user is no longer trackable. The tracking counter is used to determine the transition level. The condition that the eye position of the given eye is no longer trackable corresponds to a state in which the tracker is unable to estimate the eye position of the given eye with sufficient reliability. When the eye position of the given eye is trackable, the image is displayed to the given eye without performing the one or both of modifying the pixel intensity values of the image or interpolating the virtual depth at which the at least one virtual object is presented in the image. The term "virtual depth" as used throughout the present disclosure refers to a depth at which at least one virtual object is presented in the image displayed to the given eye of the given user.

Optionally, the image for display to the given eye is generated or retrieved by the at least one processor based on a latest eye position of the given eye relative to the image plane. The latest eye position corresponds to a last successfully tracked eye position of the given eye, or is determined by predicting the eye position based on previously-tracked eye positions. The at least one processor is configured to increment the tracking counter for each instance in which the eye position of the given eye is not trackable.

The modification of the pixel intensity values of the image based on the transition level is used to fade out the image. The term "transition level" as used throughout the present disclosure refers to a value derived from the tracking counter. The transition level is used to modify pixel intensity values or interpolate a virtual depth in the image. The term "modification" as used throughout the present disclosure refers to altering the pixel intensity values of the image based on the transition level, including operations such as linear fade, exponential fade, or alpha blending. For example, the modification involves additional transformations depending on implementation of the at least one processor, including but not limited to, desaturation or changes in transparency.

The interpolation of the virtual depth is performed based on the transition level, to progressively adjust the depth at which the at least one virtual object is presented in the image. The term "interpolating" as used throughout the present disclosure refers to computation of intermediate virtual depth values for the at least one virtual object, based on the progression between the original virtual depth and the pre-selected virtual depth. The term "original virtual depth" as used throughout the present disclosure refers to the virtual depth at which the at least one virtual object is intended to be presented in the image to provide the three-dimensional image. The term "pre-selected virtual depth" as used throughout the present disclosure refers to the depth value selected in advance for use when the eye position of the given eye is not trackable. For example, the pre-selected virtual depth corresponds to a native optical distance of the autostereoscopic display from the given eye of the given user along a viewing direction of the given eye of the given user. The configuration of the at least one processor to perform one or both of modifying the pixel intensity values or interpolating the virtual depth, based on the transition level, provides a technical benefit of progressively modifying the image displayed to the given eye of the given user during tracking loss and recovery from tracking loss. The ability of the system to adjust the image content according to the tracking counter enables a technical benefit of reducing abrupt changes in the image displayed to the given eye of the given user when the eye position of the given eye is no longer trackable. The capability of the at least one processor to generate or retrieve the image based on the latest eye position allows a technical benefit of avoiding display of the image at an incorrect virtual depth or with incorrect pixel intensity values. The repeated execution of the operations of the at least one processor, including incrementing the tracking counter, mapping the value of the tracking counter to the transition level, and performing at least one of modifying the pixel intensity values or interpolating the virtual depth, until the tracking counter reaches the first predefined threshold value, enables a technical benefit of maintaining consistent presentation of the image to the given eye of the given user during temporary periods when the eye position is not trackable by the tracker.

The at least one processor is configured to display the image. The incrementing of the tracking counter, the mapping of the value of the tracking counter to the transition level, the performing of the at least one of: (i), (ii), and the displaying of the image are repeated until the tracking counter reaches a first predefined threshold value. The term "first predefined threshold value" as used throughout the present disclosure refers to a tracking counter value at which the transition from a trackable to a non-trackable state of the given eye is considered complete for the purposes of modifying or interpolating the image. The image displayed to the given eye is generated or retrieved once, based on the latest eye position of the given eye of the given user relative to the image plane of the autostereoscopic display. The subsequent operations of the at least one processor of incrementing the tracking counter, mapping the tracking counter to the transition level, performing one or both of modifying the pixel intensity values or interpolating the virtual depth, and displaying the image, are repeated using the same image. The repetition of the operations of the at least one processor, including incrementing the tracking counter, mapping the tracking counter to the transition level, performing one or both of modifying the pixel intensity values or interpolating the virtual depth, and displaying the image, enables progressive adjustment of the image over time without generating or retrieving a new image for each repetition cycle. The repeated application of the transition level allows gradual fading out of the image or gradual interpolation of the virtual depth of the at least one virtual object, depending on implementation of the at least one processor.

Further, optionally, the first predefined threshold value may lie in a range from 10 to 100. For example, in an implementation of the system operating at a frame rate of 100 frames per second, a first predefined threshold value of 100 allows the fading out or interpolation of virtual depth to occur over approximately one second. The repetition of the operations up to the first predefined threshold value provides a technical benefit of maintaining consistent presentation of the image to the given eye of the given user during temporary periods when the eye position of the given eye is not trackable by the tracker, and enables a technical benefit of progressively modifying the image based on the tracking state.

Optionally, the incrementing of the tracking counter, the mapping of the value of the tracking counter to the transition level, and the performing of the at least one of: (i), (ii) are performed for selected frames, while the displaying of the image is performed for each frame. The term "selected frames" as used throughout the present disclosure refers to specific frames within a sequence of image frames, such that the specific frames are selected according to a predetermined or computed pattern. The selected frames may include every $N^{th}$ frame, a non-uniform sequence of frames such as every second frame for a defined number of initial iterations followed by every third frame, a predefined sequence such as the second, fifth, eighth, tenth, thirteenth, and fifteenth frames, a pseudorandom sequence of frames, or other frame selection patterns, depending on implementation of the at least one processor.

The selective performance of the operations for selected frames allows a technical benefit of reducing computational load during periods when the eye position of the given eye of the given user is not trackable. The reduction in computation enables a technical benefit of improving energy efficiency in implementations of the system that operate in battery-powered environments, such as in automotive HUDs. The configuration in which the image is displayed for each frame enables a technical benefit of preserving continuous progression in pixel intensity modification or virtual depth interpolation, without introducing blinking or stuttering in the image displayed to the given eye. The configuration in which the image is displayed for each frame while the incrementing of the tracking counter, the mapping to the transition level, and the performance of pixel intensity modification or virtual depth interpolation are performed for selected frames enables a technical benefit of achieving high temporal resolution in the display of the image. The continuous presentation of the image across all frames supports a fine-grained progression of visual updates, which reduces the likelihood of perceptible discontinuities or visual artifacts during adjustment. The repetition of the image display for every frame in combination with gradual adjustments applied in selected frames allows a technical benefit of supporting smoother changes in the pixel intensity values or the virtual depth, enabling seamless transitions during temporary tracking loss or recovery. Further, the configuration in which only selected frames are used for computationally intensive operations while maintaining display of the image for all frames allows a technical benefit of supporting fast response time. The timely application of the transition level ensures that the visual changes applied to the image appear natural and fluid to the given eye of the given user.

Optionally, the at least one processor is configured to:

detect a power-saving mode of the system; and perform the incrementing of the tracking counter, the mapping of the value of the tracking counter to the transition level, and the performing of the at least one of: (i), (ii) for the selected frames, when the power-saving mode is detected.

The term "power-saving mode" as used throughout the present disclosure refers to a mode of operation of the system in which one or more processing operations are selectively reduced to conserve power. The power-saving mode may be detected by the at least one processor based on a battery level of the system or a battery level of a vehicle in which the system is implemented. The system may be configured to enter the power-saving mode when the battery level drops below a predefined threshold battery level.

The detection of the power-saving mode and the performance of the specified operations for the selected frames provides a technical benefit of reducing computational load during periods when power conservation is required. The reduction in computation enables a technical benefit of improving energy efficiency in implementations of the system deployed in battery-powered environments, such as in automotive HUDs. The configuration in which the image is still displayed for each frame allows a technical benefit of maintaining consistent presentation of the image to the given eye, while reducing the frequency of processing steps that modify or interpolate the image.

Optionally, the at least one processor is configured to:

detect, after the eye position of the given eye was no longer trackable, that the eye position of the given eye has become trackable by the tracker;

when it is detected, after the eye position of the given eye was no longer trackable, that the eye position of the given eye has become trackable by the tracker, generate or retrieve a new image for display to the given eye;

decrement the tracking counter, wherein said decrementing begins from a second predefined threshold value;

map a value of the tracking counter to a transition level;

perform at least one of:

(iii) modifying pixel intensity values of the new image, based on the transition level, to fade in the new image, (iv) interpolating a virtual depth at which at least one virtual object is presented in the new image, between a pre-selected virtual depth and an original virtual depth of the at least one virtual object, based on the transition level; and display the new image to the given eye, wherein the generating or retrieving of new images, the decrementing of the tracking counter, the mapping of the value of the tracking counter to the transition level, the performing of the at least one of: (iii), (iv), and the displaying of the new images are repeated until the tracking counter reaches a third predefined threshold value.

The detection that the eye position of the given eye of the given user has become trackable after previously being no longer trackable allows the system to resume image presentation operations specific to the given user. Upon detecting that the eye position of the given eye of the given user is trackable, the at least one processor is configured to generate or retrieve a new image for display to the given eye of the given user. The new image is distinct from the image used during the period when the eye position was not trackable, and is generated or retrieved based on the updated eye position of the given eye of the given user relative to the image plane of the autostereoscopic display.

The decrementing of the tracking counter is initiated from the second predefined threshold value. The term "second predefined threshold value" as used throughout the present disclosure refers to a numerical value from which the tracking counter begins decrementing after the eye position of the given eye of the given user becomes trackable. The second predefined threshold value may be the same as or different from the first predefined threshold value. In implementations of the system where the second predefined threshold value is different from the first predefined threshold value, the tracking counter may be re-set to the second predefined threshold value upon detecting that the eye position of the given eye of the given user has become trackable by the tracker.

The new image is displayed to the given eye of the given user while the tracking counter is decremented and the value of the tracking counter is mapped to the transition level. Further, the at least one processor performs at least one of modifying the pixel intensity values of the new image based on the transition level to fade in the new image, or interpolating the virtual depth of at least one virtual object between the pre-selected virtual depth and the original virtual depth based on the transition level. The generation or retrieval of the new image, the decrementing of the tracking counter, the mapping to the transition level, the performance of at least one of modifying the pixel intensity values or interpolating the virtual depth, and the displaying of the new image are repeated until the tracking counter reaches the third predefined threshold value. The term "third predefined threshold value" as used throughout the present disclosure refers to a numerical value that represents completion of a transition back to display conditions of the corresponding to the tracked eye position of the given eye of the given user. The third predefined threshold value may be predefined as zero or any other numerical value, depending on implementation of the at least one processor.

The performance of the operations of the at least one processor, including generating or retrieving the new image, decrementing the tracking counter, mapping the tracking counter to the transition level, performing one or both of modifying the pixel intensity values or interpolating the virtual depth, and displaying the new image, enables a technical benefit of progressively restoring image presentation specific to the given user, to the given eye of the given user after recovery from tracking loss. The use of the transition level to fade in the image or interpolate the virtual depth allows a technical benefit of avoiding abrupt changes in image appearance during tracking recovery. The gradual decrementing of the tracking counter and the continuous display of the new image during execution of the foregoing operations provide a technical benefit of maintaining consistent presentation of the image to the given eye of the given user during re-establishment of trackable viewing conditions.

Optionally, the at least one processor is configured to:
determine a confidence level of the system in detecting that the eye position of the given eye has become trackable by the tracker;
detect when the confidence level exceeds a predefined threshold confidence level; and
when it detected that the confidence level exceeds the predefined threshold confidence level, apply a weight to the transition level, prior to performing the at least one of: (iii), (iv).

The term "confidence level" as used throughout the present disclosure refers to a value that indicates how accurately the system is able to detect the eye position of the given eye of the given user using the tracker. A higher confidence level indicates that the eye position is detected with greater accuracy, whereas a lower confidence level suggests that the tracking of the eye position is unreliable or degrading. When it is detected that the confidence level exceeds the predefined threshold confidence level, the at least one processor is configured to apply the weight to the transition level prior to performing one or both of modifying the pixel intensity values or interpolating the virtual depth. The application of the weight allows the system to modulate how quickly the transition level changes over time. The application of a higher weight causes the transition level to change more rapidly, while a lower weight slows down the progression of the transition level. The configuration in which stronger tracking results in faster fade-in or faster interpolation of virtual depth, and weaker tracking results in slower fade-in or slower interpolation, allows a technical benefit of aligning the image transition rate with the reliability of the input to the tracker. The configuration of the at least one processor to apply a weight to the transition level based on the confidence level enables a technical benefit of reducing abrupt changes in the displayed image during recovery from tracking loss while responding proportionally to the quality of tracking information.

Optionally, the at least one processor is configured to:
detect when an eye position of an eye of another user has become trackable by the tracker relative to the image plane;
when it is detected that the eye position of the eye of the another user has become trackable by the tracker,
generate or retrieve a new image for display to the eye;
decrement the tracking counter, wherein said decrementing begins from a second predefined threshold value;
map a value of the tracking counter to a transition level;
perform at least one of:
(iii) modifying pixel intensity values of the new image, based on the transition level, to fade in the new image,
(iv) interpolating a virtual depth at which at least one virtual object is presented in the new image, between a pre-selected virtual depth and an original virtual depth of the at least one virtual object, based on the transition level; and
display the new image to the eye,
wherein the generating or retrieving of new images, the decrementing of the tracking counter, the mapping of the value of the tracking counter to the transition level, the performing of the at least one of: (iii), (iv), and the displaying of the new images are repeated until the tracking counter reaches a third predefined threshold value.

The implementation of the system for handling the given user and another user allows the system to switch between the given user and another user without abrupt changes in the displayed image. The configuration in which the eye position of the eye of another user is detected relative to the image plane allows the system to initiate a transition in image display from the given user to the another user. The generation or retrieval of the new image for display to the eye of the another user is initiated once tracking of the eye position of the another user is detected. The subsequent decrementing of the tracking counter begins from the second predefined threshold value, and the value of the tracking counter is mapped to the transition level.

The configuration of the at least one processor to perform one or both of modifying the pixel intensity values of the new image based on the transition level to fade in the new image or interpolating the virtual depth at which the at least one virtual object is presented in the new image, based on the transition level, enables a technical benefit of progressively adjusting the image presentation for the eye of the another user. The repeated performance of modifying the pixel intensity values or interpolating the virtual depth based on the transition level, while the new image is displayed to the eye of the another user until the tracking counter reaches the third predefined threshold value, provides a technical benefit of maintaining consistent presentation of the image to the eye of the another user during transition from the given user.

Optionally, when interpolating the virtual depth, the at least one processor is configured to:
determine an intermediate eye position by interpolating between the eye position of the given eye of the given user and the eye position of the eye of the another user, based on the transition level; and
determine the pre-selected virtual depth and the original virtual depth with respect to the intermediate eye position, prior to interpolating the virtual depth at which the at least one virtual object is presented in the new image.

The term "intermediate eye position" as used throughout the present disclosure refers to an eye position determined by interpolating between the eye position of the given eye of the given user and the eye position of the eye of the another user, based on the transition level. The intermediate eye position represents a position along a path between the two eye positions specific to different users and is used to determine image parameters during a transition from one user to another. The implementation of the system in which the at least one processor is configured to determine the intermediate eye position based on the transition level allows interpolation between the eye position of the given user and the eye position of the another user. The determination of the intermediate eye position serves as an alternative mechanism for transitioning from the given user to the another user, where pixel intensity values are not modified, and only the virtual depth is adjusted based on a spatial interpolation between eye positions. The interpolation of the virtual depth with respect to the intermediate eye position allows the image to appear consistent during the handoff of image rendering from one user to another.

The configuration of the at least one processor to determine the pre-selected virtual depth and the original virtual depth with respect to the intermediate eye position enables a technical benefit of ensuring that the virtual depth of the at least one virtual object adjusts smoothly during transitions between the given user and the another user, avoiding abrupt depth shifts or perceived visual discontinuities. The use of the intermediate eye position allows a technical benefit of continuously adapting the perceived depth of the at least one virtual object, thereby reducing visual discomfort associated with abrupt perspective changes. The ability to interpolate between eye positions specific to different users also provides a technical benefit of making the system adaptable to movement of the user in real-time during transitions in tracking between the given user and another user.

Optionally, the at least one processor is configured to:
  determine a confidence level of the system in detecting that the eye position of the eye of the another user has become trackable by the tracker;
  detect when the confidence level exceeds a predefined threshold confidence level; and
  when it detected that the confidence level exceeds the predefined threshold confidence level, apply a weight to the transition level, prior to performing the at least one of: (iii), (iv).

The application of the weight to the transition level by the at least one processor allows the system to modulate the rate at which the transition occurs when initiating image display for the eye of another user. A higher confidence level results in a higher weight being applied to the transition level, causing the fade-in or interpolation of virtual depth to occur more quickly. Conversely, when the confidence level is closer to the predefined threshold confidence level, the weight is reduced, resulting in a slower and more gradual transition when initiating the image display for the eye of another user. The configuration of the at least one processor to apply the weight based on the confidence level allows a technical benefit of aligning the rate at which the transition occurs with the quality of input to the tracker, reducing abrupt changes in the displayed image and abrupt changes during switching between the given user and the another user.

Optionally, the at least one processor is configured to:
  when it is detected that the eye position of the eye of the another user has become trackable by the tracker,
    determine a relative position of the eye of the another user with respect to an optical axis of the image plane, and a direction of change of the relative position of the eye of the another user over a first predefined time period;
    detect, based on the relative position of the eye of the another user with respect to the optical axis and the direction of change of the relative position of the eye of the another user, whether the eye of the another user has moved inside a predefined viewing zone of the system; and
    decrement the tracking counter, when it is detected that the eye of the another user has moved inside the predefined viewing zone.

The implementation in which the at least one processor is configured to determine the relative position of the eye of the another user with respect to the optical axis of the image plane and the direction of change of the relative position over the first predefined time period allows the at least one processor to assess whether the eye of the another user is moving into a position suitable for initiating image presentation specific to the another user. The determination of the relative position of the eye of the another user with respect to the optical axis of the image plane and the direction of change of the relative position over the first predefined time period allows the system to detect an intentional movement of the another user into the appropriate viewing region.

The term "predefined viewing zone" as used throughout the present disclosure refers to a three-dimensional zone within which eyes of the another user can be positioned to see a visual scene being presented by the system. The direction of change of the relative position of the eye of the another user allows a technical benefit of reducing false detections of user presence in the predefined viewing zone. For example, momentary appearances of the eye of the another user within the predefined viewing zone due to tracking noise are ignored if the direction of change does not correspond to a sustained or deliberate movement of the another user into the predefined viewing zone.

The configuration of the at least one processor to decrement the tracking counter only when it is detected that the eye of the another user has moved into the predefined viewing zone based on the relative position and the direction of change enables a technical benefit of progressively transitioning the image presentation between the given user and the another user. As the tracking counter for the eye of the another user is decremented, the rendering is faded in to reflect the viewing geometry of the another user, while simultaneously fading out the image for the previous user. The coordinated decrementing of the tracking counter for the eye of the another user and the corresponding fading out of the image for the given user based on the detected movement allows a technical benefit of initiating a stable transition only when the another user is intentionally entering the predefined viewing zone of the system.

Optionally, the at least one processor is configured to:
  when it is detected that the eye position of the given eye is no longer trackable by the tracker,
    determine a relative position of the given eye of the given user with respect to an optical axis of the image plane, and a direction of change of the relative position of the given eye over a second predefined time period;
    detect, based on the relative position of the given eye of the given user with respect to the optical axis and the direction of change of the relative position of the given eye of the given user, whether the given eye of the given user has moved outside a predefined viewing zone of the system; and
    increment the tracking counter, when it is detected that the given eye of the given user has moved outside the predefined viewing zone.

The implementation of the system in which the at least one processor is configured to determine the relative position of the given eye and the direction of change of the relative position allows the at least one processor to incorporate directional movement of the given eye of the given user into the evaluation of continuity of the tracking. The determination of the relative position of the given eye of the given user with respect to the optical axis of the image plane, combined with the direction of change over the second predefined time period, allows the system to assess whether the given user is intentionally leaving the predefined viewing zone of the system.

The direction of change of the relative position of the given eye of the given user allows a technical benefit of reducing incorrect detections that the given eye of the given user has moved outside the predefined viewing zone. For example, the eye position of the given eye may momentarily become no longer trackable due to occlusion or noise, but if the given eye remains within the predefined viewing zone and does not exhibit directional movement away from the optical axis, the at least one processor avoids unnecessary incrementing of the tracking counter. The configuration of the at least one processor to use the direction of change in combination with the relative position of the given eye enables a technical benefit of ensuring that the tracking counter is incremented only when the given user is actually moving out of the predefined viewing zone, thereby reducing visual artifacts such as flickering or premature image transitions.

The configuration of the at least one processor to determine the relative position of the given eye and the direction of change of the relative position, detect movement outside the predefined viewing zone, and increment the tracking counter based on that detection allows a technical benefit of supporting incrementing of the tracking counter for the given user based on directional movement of the given eye away from the optical axis. As the tracking counter for the given user increases, the rendering for that user is progressively faded out, while the rendering for the another user may be faded in. The use of the relative position of the given eye of the given user with respect to the optical axis, together with the direction of change of the relative position over the second predefined time period, allows a technical benefit of supporting smooth transitions between eyes being tracked of different users or between different rendering conditions of images, without being affected by temporary inconsistencies in eye tracking.

Optionally, the at least one processor is configured to:
when it is detected that the eye position of the given eye is no longer trackable by the tracker, and when the modifying of the pixel intensity values of the image is performed,
retrieve a pre-selected image for display;
display the pre-selected image after the tracking counter reaches the first predefined threshold value.

The configuration of the at least one processor to retrieve the pre-selected image after the tracking counter reaches the first predefined threshold value allows the system to avoid rendering a blank screen or unintended visual artifacts when tracking remains unavailable for an extended period. The term "pre-selected image" as used throughout the present disclosure refers to an image selected in advance for display when the eye position of the given eye of the given user remains no longer trackable. The pre-selected image may include a logo, a warning message, a static user interface element, or any other two-dimensional image that appears visually consistent from a wide range of viewing directions, including in the absence of any tracking data specific to the given user.

The retrieval and display of the pre-selected image provides a technical benefit of improving the visual experience when eye tracking is unavailable for longer durations. When the eye position remains no longer trackable, instead of continuing to fade the previously displayed image toward black or indefinitely holding the last known rendering, the system transitions to a visually meaningful and intentional display. The transition to the pre-selected image may be performed by the at least one processor through progressive fading in of the pre-selected image, optionally including a cross-fade with the image that was being displayed before the tracking counter reached the first predefined threshold value.

The implementation of the system in which the at least one processor retrieves and displays the pre-selected image after the tracking counter reaches the first predefined threshold value enables a technical benefit of preventing abrupt visual loss and maintaining a consistent user experience under conditions where the eye position of the given eye remains no longer trackable for an extended period. The ability to display the pre-selected image after the tracking counter reaches the first predefined threshold value is useful in use cases such as trade show demonstrations or automotive environments where continuous visual feedback is preferable to a blank screen.

The present disclosure further relates to the method as described above. Various embodiments and variants disclosed above with respect to the system described in the first aspect, apply mutatis mutandis to the method in the second aspect.

Optionally, the method further comprises incrementing of the tracking counter, the mapping of the value of the tracking counter to the transition level, and the performing of the at least one of: (i), (ii) are performed for selected frames, while the displaying of the image is performed for each frame. A key technical benefit of performing the incrementing of the tracking counter, the mapping of the value of the tracking counter to the transition level, and the performing of the at least one of modifying the pixel intensity values of the image or interpolating the virtual depth for selected frames, while displaying the image for each frame, is the reduction in computational load during periods when the eye position of the given eye is no longer trackable. The reduction in the computational load enables improved energy efficiency in implementations where power consumption is critical, such as battery-powered HUDs. The act of displaying the image for each frame ensures continuous progression of the image transition, whether by fading or by depth interpolation, thereby avoiding blinking or stuttering effects in the displayed image. The performance of the specified steps for selected frames allows efficient use of processing resources without compromising the visual consistency of the image presented to the given eye of the given user.

Optionally, the method further comprises:
detecting a power-saving mode; and
performing the incrementing of the tracking counter, the mapping of the value of the tracking counter to the transition level, and the performing of the at least one of: (i), (ii) for the selected frames, when the power-saving mode is detected.

A key technical benefit of detecting the power-saving mode and performing the incrementing of the tracking counter, the mapping of the value of the tracking counter to the transition level, and the performing of the at least one of modifying the pixel intensity values of the image or interpolating the virtual depth for selected frames, when the power-saving mode is detected, is the reduction in computational load during periods when power conservation is required. The reduction in processing frequency improves energy efficiency in implementations of the method in battery-powered environments such as automotive HUDs. The continued display of the image for each frame while selectively performing image modifications contributes to maintaining consistent presentation of the image to the given eye of the given user, while minimizing power consumption during extended periods of tracking loss.

Optionally, the method further comprising:
  detecting, after the eye position of the given eye was no longer trackable, that the eye position of the given eye has become trackable by the tracker;
  when it is detected, after the eye position of the given eye was no longer trackable, that the eye position of the given eye has become trackable by the tracker,
    generating or retrieving a new image for display to the given eye;
    decrementing the tracking counter, wherein said decrementing begins from a second predefined threshold value;
    mapping a value of the tracking counter to a transition level;
    performing at least one of:
      (iii) modifying pixel intensity values of the new image, based on the transition level, to fade in the new image,
      (iv) interpolating a virtual depth at which at least one virtual object is presented in the new image, between a pre-selected virtual depth and an original virtual depth of the at least one virtual object, based on the transition level; and
    displaying the new image to the given eye,
  wherein the generating or retrieving of new images, the decrementing of the tracking counter, the mapping of the value of the tracking counter to the transition level, the performing of the at least one of: (iii), (iv), and the displaying of the new images are repeated until the tracking counter reaches a third predefined threshold value.

A key technical benefit of detecting that the eye position of the given eye has become trackable after previously being no longer trackable, and performing the steps of generating or retrieving the new image for display, decrementing the tracking counter from the second predefined threshold value, mapping the tracking counter to the transition level, performing at least one of modifying pixel intensity values of the new image or interpolating the virtual depth, and displaying the new image until the tracking counter reaches the third predefined threshold value, is the progressive restoration of viewer-specific image presentation to the given eye of the given user during recovery from tracking loss. The use of the transition level to control the fade-in or depth interpolation enables avoidance of abrupt changes in the displayed image during transition from a condition in which the eye position of the given eye of the given user is no longer trackable to a condition in which the eye position of the given eye of the given user is trackable. The repetition of the steps over a period defined by the second threshold value and the third predefined threshold value facilitates consistent and gradual return to normal viewing, supporting continuity of the user experience and visual stability during re-establishment of tracking.

Optionally, the method further comprises:
  determining a confidence level in detecting that the eye position of the given eye has become trackable by the tracker;
  detecting when the confidence level exceeds a predefined threshold confidence level; and
  when it is detected that the confidence level exceeds the predefined threshold confidence level, applying a weight to the transition level, prior to performing the at least one of: (iii), (iv).

A key technical benefit of determining the confidence level in detecting that the eye position of the given eye has become trackable, detecting when the confidence level exceeds the predefined threshold confidence level, and applying the weight to the transition level prior to performing at least one of modifying pixel intensity values of the new image or interpolating the virtual depth, is the alignment of the rate of image transition with the reliability of input to the tracker. The application of a higher weight in cases of stronger tracking confidence enables a faster fade-in or quicker interpolation of virtual depth, while a lower confidence level results in a slower progression of the transition level. Adjusting the progression of the transition level based on the confidence level allows a consistent update of the image during transition, while reducing abrupt changes in the displayed image. The method thereby facilitates a technical benefit of reducing abrupt changes in the displayed image during recovery from tracking loss while adjusting how the transition level is applied to the image according to the quality of eye tracking.

Optionally, the method further comprises:
  detecting when an eye position of an eye of another user has become trackable by the tracker relative to the image plane;
  when it is detected that the eye position of the eye of the another user has become trackable by the tracker,
    generating or retrieving a new image for display to the eye;
    decrementing the tracking counter, wherein said decrementing begins from a second predefined threshold value;
    mapping a value of the tracking counter to a transition level;
    performing at least one of:
      (iii) modifying pixel intensity values of the new image, based on the transition level, to fade in the new image,
      (iv) interpolating a virtual depth at which at least one virtual object is presented in the new image, between a pre-selected virtual depth and an original virtual depth of the at least one virtual object, based on the transition level; and
    displaying the new image to the eye,
  wherein the generating or retrieving of new images, the decrementing of the tracking counter, the mapping of the value of the tracking counter to the transition level, the performing of the at least one of: (iii), (iv), and the displaying of the new images are repeated until the tracking counter reaches a third predefined threshold value.

A key technical benefit of detecting when the eye position of the eye of another user has become trackable relative to the image plane, generating or retrieving the new image for display to the eye, decrementing the tracking counter from the second predefined threshold value, mapping the value of the tracking counter to the transition level, performing at least one of modifying pixel intensity values of the new image or interpolating the virtual depth, and displaying the new image until the tracking counter reaches the third predefined threshold value, is the progressive adjustment of the image presentation during transition from the given user to the another user. The transition avoids abrupt changes in the displayed image and supports gradual progression of image presentation specific to the given user for the eye of the another user. The method thereby enables a technical benefit of maintaining consistent presentation of the image to the another user while reducing abrupt changes in the displayed image during switching among different users.

Optionally, the method comprising interpolating the virtual depth comprises:
    determining an intermediate eye position by interpolating between the eye position of the given eye of the given user and the eye position of the eye of the another user, based on the transition level; and
    determining the pre-selected virtual depth and the original virtual depth with respect to the intermediate eye position, prior to interpolating the virtual depth at which the at least one virtual object is presented in the new image.

A key technical benefit of determining the intermediate eye position by interpolating between the eye position of the given eye of the given user and the eye position of the eye of the another user, and determining the pre-selected virtual depth and the original virtual depth with respect to the intermediate eye position prior to interpolating the virtual depth at which the at least one virtual object is presented in the new image, is the ability to smoothly adjust the virtual depth during transition between different users. The interpolation of eye positions enables progressive adjustment of depth perception without altering pixel intensity values, providing continuity in visual presentation. The use of the intermediate eye position allowing the virtual depth to adapt continuously as the eye position of the user changes, reducing abrupt changes in perceived depth and associated visual discomfort. The method thereby enables a technical benefit of facilitating seamless transition of the image presentation between the given user and the another user, even when the eye position of the given eye or the eye of the another user changes in real time.

Optionally, the method further comprises:
    determining a confidence level in detecting that the eye position of the eye of the another user has become trackable by the tracker;
    detecting when the confidence level exceeds a predefined threshold confidence level; and
    when it detected that the confidence level exceeds the predefined threshold confidence level, applying a weight to the transition level, prior to performing the at least one of: (iii), (iv).

A key technical benefit of determining the confidence level in detecting that the eye position of the eye of the another user has become trackable by the tracker, detecting when the confidence level exceeds the predefined threshold confidence level, and applying the weight to the transition level prior to performing at least one of modifying the pixel intensity values of the new image or interpolating the virtual depth, is the ability to modulate the rate of transition according to the quality of eye tracking. When the confidence level is high, the weight applied to the transition level allows faster fade-in or quicker interpolation of the virtual depth. Conversely, when the confidence level is closer to the predefined threshold confidence level, the transition proceeds more gradually. The application of the weight based on the confidence level enables a technical benefit of reducing abrupt changes in the displayed image during initiation of image display for the eye of the another user, while dynamically adapting the visual response to the reliability of the input to the tracker.

Optionally, the method further comprises:
    when it is detected that the eye position of the eye of the another user has become trackable by the tracker,
        determining a relative position of the eye of the another user with respect to an optical axis of the image plane, and a direction of change of the relative position of the eye of the another user over a first predefined time period;
        detecting, based on the relative position of the eye of the another user with respect to the optical axis and the direction of change of the relative position of the eye of the another user, whether the eye of the another user has moved inside a predefined viewing zone; and
        decrementing the tracking counter, when it is detected that the eye of the another user has moved inside the predefined viewing zone.

A key technical benefit of determining the relative position of the eye of the another user with respect to the optical axis of the image plane, determining the direction of change of the relative position over the first predefined time period, detecting whether the eye of the another user has moved inside the predefined viewing zone based on the relative position and direction of change, and decrementing the tracking counter when the eye of the another user has moved inside the predefined viewing zone, is the ability to selectively initiate transition only when the another user is intentionally entering the predefined viewing zone. The use of the direction of change of the relative position of the eye of the another user enables a technical benefit of avoiding detection of entry into the predefined viewing zone in cases where the eye position appears within the predefined viewing zone only due to momentary tracking noise or short-term deviations. The decrementing of the tracking counter based on verified entry of the another user into the predefined viewing zone supports a technical benefit of progressively transitioning image display to the another user in a perceptually stable manner.

Optionally, the method further comprises:
    when it is detected that the eye position of the given eye is no longer trackable by the tracker,
        determining a relative position of the given eye of the given user with respect to an optical axis of the image plane, and a direction of change of the relative position of the given eye over a second predefined time period;
        detecting, based on the relative position of the given eye of the given user with respect to the optical axis and the direction of change of the relative position of the given eye of the given user, whether the given eye of the given user has moved outside a predefined viewing zone; and
        incrementing the tracking counter, when it is detected that the given eye of the given user has moved outside the predefined viewing zone.

A key technical benefit of determining the relative position of the given eye of the given user with respect to the optical axis of the image plane, determining the direction of change of the relative position over the second predefined time period, detecting whether the given eye of the given user has moved outside the predefined viewing zone based on the relative position and the direction of change, and incrementing the tracking counter when it is detected that the given eye of the given user has moved outside the predefined viewing zone, is the ability to identify deliberate exit of the given user from the predefined viewing zone. The use of the direction of change of the relative position of the given eye of the given user enables a technical benefit of avoiding incrementing the tracking counter when the eye position of the given eye of the given user is no longer trackable due to short-term interruptions or fluctuations in the input to the tracker. The method thereby enables a technical benefit of reducing artifacts such as flickering or abrupt transitions in the image by confirming actual movement of the given user away from the predefined viewing zone before altering the display of the image.

Optionally, the method further comprises:
when it is detected that the eye position of the given eye is no longer trackable by the tracker, and when the modifying of the pixel intensity values of the image is performed,
retrieving a pre-selected image for display; and
displaying the pre-selected image after the tracking counter reaches the first predefined threshold value.

A key technical benefit of retrieving the pre-selected image for display when the modifying of the pixel intensity values of the image is performed and displaying the pre-selected image after the tracking counter reaches the first predefined threshold value is the ability to avoid blank screens or unintended visual artifacts during extended periods when the eye position of the given eye is not trackable. The pre-selected image may include a logo, a warning message, a static user interface element, or any other two-dimensional image selected in advance for display that remains visually appropriate across multiple viewing directions. The configuration in which the pre-selected image is displayed after reaching the first predefined threshold value allows a technical benefit of maintaining a consistent visual experience even during prolonged tracking failure. Additionally, the display of the pre-selected image may include progressive fading in or cross-fading with the previously displayed image, enabling a technical benefit of achieving a smooth visual transition into display of the pre-selected image.

DETAILED DESCRIPTION OF THE DRAWINGS

Figure 1:
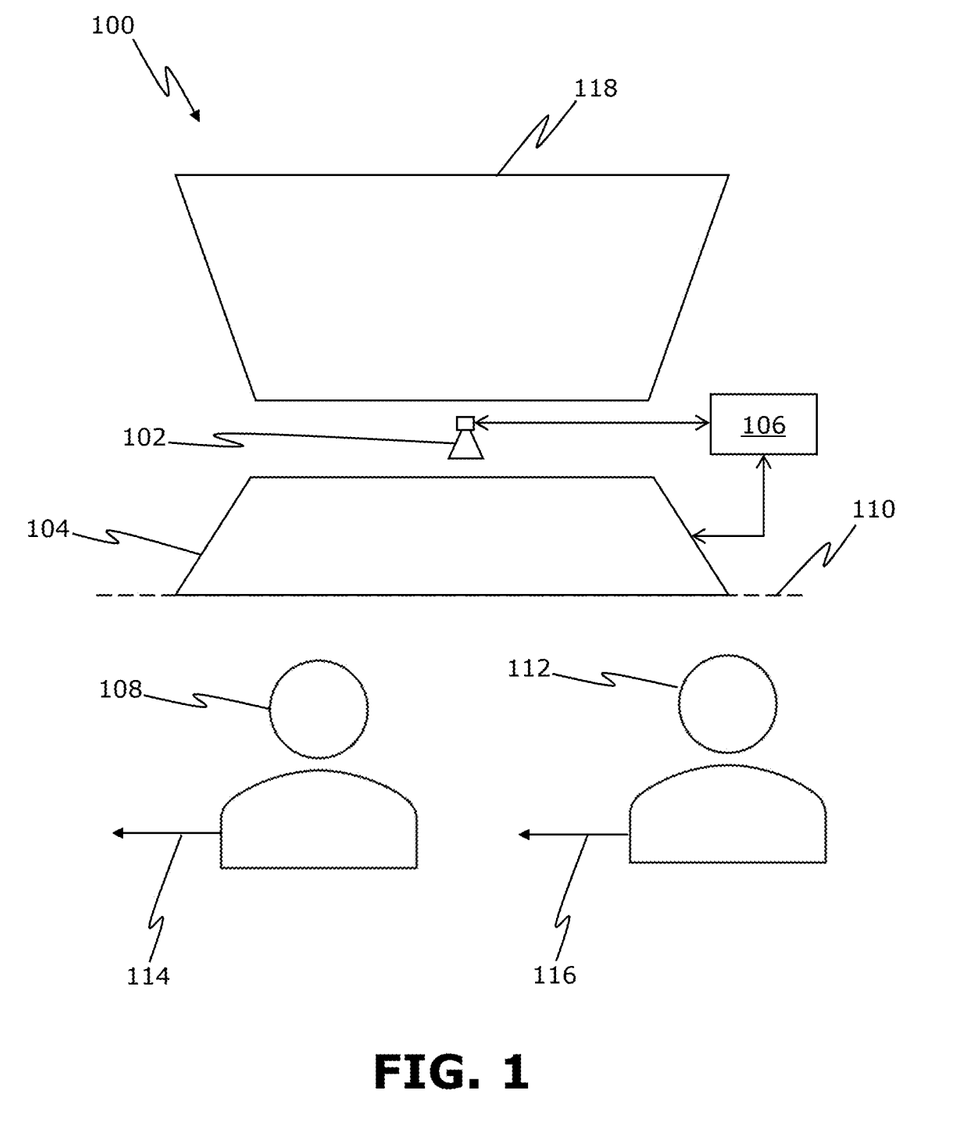
FIG. 1 shows a simplified top view of a system in a first aspect, in accordance with an embodiment of the present disclosure.

FIG. 1 shows a simplified top view of a system 100 in a first aspect, in accordance with an embodiment of the present disclosure. The system 100 comprises a tracker 102, an autostereoscopic display 104 and at least processor 106. The at least one processor 106 is configured to:
track an eye position of a given eye of a given user 108 relative to an image plane 110 (indicated using a long-dashed line) of the autostereoscopic display 104, using the tracker 102;
detect when the eye position of the given eye is no longer trackable by the tracker 102; and
when it is detected that the eye position of the given eye is no longer trackable by the tracker 102:
generate or retrieve an image for display to the given eye;
increment a tracking counter;
map a value of the tracking counter to a transition level;
perform at least one of:
(i) modifying pixel intensity values of the image, based on the transition level, to fade out the image,
(ii) interpolating a virtual depth at which at least one virtual object is presented in the image, between an original virtual depth of the at least one virtual object and a pre-selected virtual depth, based on the transition level; and
display the image via the autostereoscopic display 104;
wherein the incrementing of the tracking counter, the mapping of the value of the tracking counter to the transition level, the performing of the at least one of: (i), (ii), and the displaying of the image 114 are repeated until the tracking counter reaches a first predefined threshold value.

The FIG. 1 shows the given user 108 moving away from a viewing area associated with the image plane 110 (indicated using an arrow 114 pointing towards left of the given user 108), such that the eye position of the given eye of the given user 108 becomes no longer trackable by the tracker 102. Simultaneously, another user 112 (indicated using an arrow 116 pointing towards left of the given user 112) is entering the viewing area corresponding to the image plane 110, and the eye position of the eye of the another user 112 becomes trackable by the tracker 102. The at least one processor 106 is configured to detect when the eye position of the eye of the another user 112 becomes trackable and to begin decrementing the tracking counter from the predefined value. The value of the tracking counter is used to determine the transition level, which is applied to at least one of modifying pixel intensity values or interpolating the virtual depth in the image generated or retrieved for the another user 112. The display of the image to the another user 112 via the autostereoscopic display 104 is adjusted until the tracking counter reaches the second predefined value, thereby allowing the system 100 to switch from the given user 108 to the another user 112 without abrupt changes in the image.

It may be understood by a person skilled in the art that FIG. 1 shows a simplified implementation of the system 100, for sake of clarity, which should not unduly limit the scope of the claims herein. The person skilled in the art will recognize many variations, alternatives, and modifications of embodiments of the present disclosure. For example, the system 100 can comprise additional components, such as, an optical combiner 118 for head-up displays (shown above the tracker 102).

Figure 2:
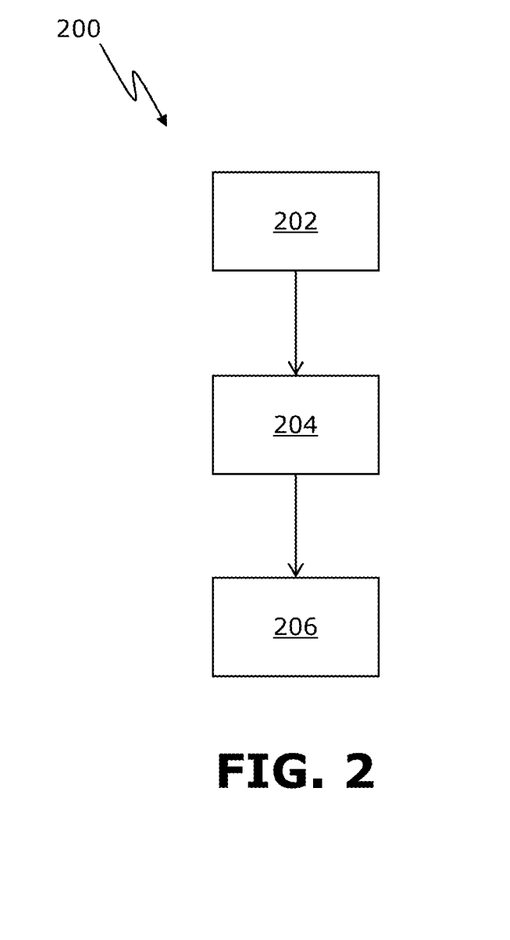
FIG. 2 shows steps of a method in a second aspect, in accordance with an embodiment of the present disclosure.

FIG. 2 shows steps of a method 200 in a second aspect, in accordance with an embodiment of the present disclosure. At step 202, an eye position of a given eye of a given user relative to an image plane of an autostereoscopic display is tracked using a tracker. At step 204, it is detected when the eye position of the given eye is no longer trackable by the tracker. At step 206, when it is detected that the eye position of the given eye is no longer trackable by the tracker:
an image for display to the given eye is generated or retrieved;
a tracking counter is incremented;
a value of the tracking counter is mapped to a transition level;
at least one of:
(i) modifying pixel intensity values of the image, based on the transition level, to fade out the image,
(ii) interpolating a virtual depth at which at least one virtual object is presented in the image, between an original virtual depth of the at least one virtual object and a pre-selected virtual depth, based on the transition level;
is performed; and
the image is displayed via the autostereoscopic display;
wherein the incrementing of the tracking counter, the mapping of the value of the tracking counter to the transition level, the performing of the at least one of: (i), (ii), and the displaying of the image are repeated until the tracking counter reaches a first predefined threshold value.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
a tracker;
an autostereoscopic display; and
at least one processor configured to:
track an eye position of a given eye of a given user relative to an image plane of the autostereoscopic display, using the tracker;
detect when the eye position of the given eye is no longer trackable by the tracker; and
when it is detected that the eye position of the given eye is no longer trackable by the tracker:
generate or retrieve an image for display to the given eye;
increment a tracking counter;
map a value of the tracking counter to a transition level;
perform at least one of:
(i) modifying pixel intensity values of the image, based on the transition level, to fade out the image,
(ii) interpolating a virtual depth at which at least one virtual object is presented in the image, between an original virtual depth of the at least one virtual object and a pre-selected virtual depth, based on the transition level; and
display the image via the autostereoscopic display;
wherein the incrementing of the tracking counter, the mapping of the value of the tracking counter to the transition level, the performing of the at least one of: (i), (ii), and the displaying of the image are repeated until the tracking counter reaches a first predefined threshold value.

2. The system of claim 1, wherein the incrementing of the tracking counter, the mapping of the value of the tracking counter to the transition level, and the performing of the at least one of: (i), (ii) are performed for selected frames, while the displaying of the image is performed for each frame.

3. The system of claim 2, wherein the at least one processor is configured to:
detect a power-saving mode of the system; and
perform the incrementing of the tracking counter, the mapping of the value of the tracking counter to the transition level, and the performing of the at least one of: (i), (ii) for the selected frames, when the power-saving mode is detected.

4. The system of claim 1, wherein the at least one processor is configured to:
detect, after the eye position of the given eye was no longer trackable, that the eye position of the given eye has become trackable by the tracker;
when it is detected, after the eye position of the given eye was no longer trackable, that the eye position of the given eye has become trackable by the tracker,
generate or retrieve a new image for display to the given eye;
decrement the tracking counter, wherein said decrementing begins from a second predefined threshold value;
map a value of the tracking counter to a transition level;
perform at least one of:
(iii) modifying pixel intensity values of the new image, based on the transition level, to fade in the new image,
(iv) interpolating a virtual depth at which at least one virtual object is presented in the new image, between a pre-selected virtual depth and an original virtual depth of the at least one virtual object, based on the transition level; and
display the new image to the given eye,
wherein the generating or retrieving of new images, the decrementing of the tracking counter, the mapping of the value of the tracking counter to the transition level, the performing of the at least one of: (iii), (iv), and the displaying of the new images are repeated until the tracking counter reaches a third predefined threshold value.

5. The system of claim 4, wherein the at least one processor is configured to:
determine a confidence level of the system in detecting that the eye position of the given eye has become trackable by the tracker;
detect when the confidence level exceeds a predefined threshold confidence level; and
when it is detected that the confidence level exceeds the predefined threshold confidence level, apply a weight to the transition level, prior to performing the at least one of: (iii), (iv).

6. The system of claim 1, wherein the at least one processor is configured to:
detect when an eye position of an eye of another user has become trackable by the tracker relative to the image plane;
when it is detected that the eye position of the eye of the another user has become trackable by the tracker,
generate or retrieve a new image for display to the eye;
decrement the tracking counter, wherein said decrementing begins from a second predefined threshold value;
map a value of the tracking counter to a transition level;
perform at least one of:
(iii) modifying pixel intensity values of the new image, based on the transition level, to fade in the new image,
(iv) interpolating a virtual depth at which at least one virtual object is presented in the new image, between a pre-selected virtual depth and an original virtual depth of the at least one virtual object, based on the transition level; and
display the new image to the eye,
wherein the generating or retrieving of new images, the decrementing of the tracking counter, the mapping of the value of the tracking counter to the transition level, the performing of the at least one of: (iii), (iv), and the displaying of the new images are repeated until the tracking counter reaches a third predefined threshold value.

7. The system of claim 6, wherein when interpolating the virtual depth, the at least one processor is configured to:
determine an intermediate eye position by interpolating between the eye position of the given eye of the given user and the eye position of the eye of the another user, based on the transition level; and
determine the pre-selected virtual depth and the original virtual depth with respect to the intermediate eye position, prior to interpolating the virtual depth at which the at least one virtual object is presented in the new image.

8. The system of claim 6, wherein the at least one processor is configured to:
determine a confidence level of the system in detecting that the eye position of the eye of the another user has become trackable by the tracker;

detect when the confidence level exceeds a predefined threshold confidence level; and when it detected that the confidence level exceeds the predefined threshold confidence level, apply a weight to the transition level, prior to performing the at least one of: (iii), (iv).

9. The system of claim 6, wherein the at least one processor is configured to:

when it is detected that the eye position of the eye of the another user has become trackable by the tracker, determine a relative position of the eye of the another user with respect to an optical axis of the image plane, and a direction of change of the relative position of the eye of the another user over a first predefined time period;

detect, based on the relative position of the eye of the another user with respect to the optical axis and the direction of change of the relative position of the eye of the another user, whether the eye of the another user has moved inside a predefined viewing zone of the system; and decrement the tracking counter, when it is detected that the eye of the another user has moved inside the predefined viewing zone.

10. The system of claim 1, wherein the at least one processor is configured to:

when it is detected that the eye position of the given eye is no longer trackable by the tracker, determine a relative position of the given eye of the given user with respect to an optical axis of the image plane, and a direction of change of the relative position of the given eye over a second predefined time period;

detect, based on the relative position of the given eye of the given user with respect to the optical axis and the direction of change of the relative position of the given eye of the given user, whether the given eye of the given user has moved outside a predefined viewing zone of the system; and increment the tracking counter, when it is detected that the given eye of the given user has moved outside the predefined viewing zone.

11. The system of claim 1, wherein the at least one processor is configured to:

when it is detected that the eye position of the given eye is no longer trackable by the tracker, and when the modifying of the pixel intensity values of the image is performed, retrieve a pre-selected image for display; and display the pre-selected image after the tracking counter reaches the first predefined threshold value.

12. A method comprising:

tracking an eye position of a given eye of a given user relative to an image plane of an autostereoscopic display, using a tracker;

detecting when the eye position of the given eye is no longer trackable by the tracker; and when it is detected that the eye position of the given eye is no longer trackable by the tracker:

generating or retrieving an image for display to the given eye;

incrementing a tracking counter;

mapping a value of the tracking counter to a transition level;

performing at least one of:

(i) modifying pixel intensity values of the image, based on the transition level, to fade out the image, (ii) interpolating a virtual depth at which at least one virtual object is presented in the image, between an original virtual depth of the at least one virtual object and a pre-selected virtual depth, based on the transition level; and displaying the image via the autostereoscopic display;

wherein the incrementing of the tracking counter, the mapping of the value of the tracking counter to the transition level, the performing of the at least one of: (i), (ii), and the displaying of the image are repeated until the tracking counter reaches a first predefined threshold value.

13. The method of claim 12, further comprising:

detecting, after the eye position of the given eye was no longer trackable, that the eye position of the given eye has become trackable by the tracker;

when it is detected, after the eye position of the given eye was no longer trackable, that the eye position of the given eye has become trackable by the tracker, generating or retrieving a new image for display to the given eye;

decrementing the tracking counter, wherein said decrementing begins from a second predefined threshold value;

mapping a value of the tracking counter to a transition level;

performing at least one of:

(iii) modifying pixel intensity values of the new image, based on the transition level, to fade in the new image, (iv) interpolating a virtual depth at which at least one virtual object is presented in the new image, between a pre-selected virtual depth and an original virtual depth of the at least one virtual object, based on the transition level; and displaying the new image to the given eye, wherein the generating or retrieving of new images, the decrementing of the tracking counter, the mapping of the value of the tracking counter to the transition level, the performing of the at least one of: (iii), (iv), and the displaying of the new images are repeated until the tracking counter reaches a third predefined threshold value.

14. The method of claim 12, further comprising:

detecting when an eye position of an eye of another user has become trackable by the tracker relative to the image plane;

when it is detected that the eye position of the eye of the another user has become trackable by the tracker, generating or retrieving a new image for display to the eye;

decrementing the tracking counter, wherein said decrementing begins from a second predefined threshold value;

mapping a value of the tracking counter to a transition level;

performing at least one of:

(iii) modifying pixel intensity values of the new image, based on the transition level, to fade in the new image, (iv) interpolating a virtual depth at which at least one virtual object is presented in the new image, between a pre-selected virtual depth and an original virtual depth of the at least one virtual object, based on the transition level; and displaying the new image to the eye, wherein the generating or retrieving of new images, the decrementing of the tracking counter, the mapping of the value of the tracking counter to the transition level, the performing of the at least one of: (iii), (iv), and the displaying of the new images are repeated until the tracking counter reaches a third predefined threshold value.

15. The method of claim 14, wherein the step of interpolating the virtual depth comprises:

determining an intermediate eye position by interpolating between the eye position of the given eye of the given user and the eye position of the eye of the another user, based on the transition level; and determining the pre-selected virtual depth and the original virtual depth with respect to the intermediate eye position, prior to interpolating the virtual depth at which the at least one virtual object is presented in the new image.

16. The method of claim 14, further comprising:

when it is detected that the eye position of the eye of the another user has become trackable by the tracker, determining a relative position of the eye of the another user with respect to an optical axis of the image plane, and a direction of change of the relative position of the eye of the another user over a first predefined time period;

detecting, based on the relative position of the eye of the another user with respect to the optical axis and the direction of change of the relative position of the eye of the another user, whether the eye of the another user has moved inside a predefined viewing zone; and decrementing the tracking counter, when it is detected that the eye of the another user has moved inside the predefined viewing zone.

17. The method of claim 12, further comprising:

when it is detected that the eye position of the given eye is no longer trackable by the tracker, determining a relative position of the given eye of the given user with respect to an optical axis of the image plane, and a direction of change of the relative position of the given eye over a second predefined time period;

detecting, based on the relative position of the given eye of the given user with respect to the optical axis and the direction of change of the relative position of the given eye of the given user, whether the given eye of the given user has moved outside a predefined viewing zone; and incrementing the tracking counter, when it is detected that the given eye of the given user has moved outside the predefined viewing zone.

\* \* \* \* \*